(12) United States Patent
Longobardi

(10) Patent No.: US 8,817,099 B2
(45) Date of Patent: *Aug. 26, 2014

(54) TRAFFIC SYSTEM FOR ENHANCING DRIVER VISIBILITY

(71) Applicant: International Business Machines Corporation, Armonk, NY (US)

(72) Inventor: Giuseppe Longobardi, Naples (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/752,260

(22) Filed: Jan. 28, 2013

(65) Prior Publication Data

US 2013/0201336 A1 Aug. 8, 2013

Related U.S. Application Data

(63) Continuation of application No. 12/469,271, filed on May 20, 2009, now Pat. No. 8,416,300.

(51) Int. Cl.
*H04N 7/18* (2006.01)
*H04N 7/00* (2011.01)

(52) U.S. Cl.
USPC ........... 348/148; 348/115; 348/136; 348/139; 348/140; 348/142; 348/143; 348/159

(58) Field of Classification Search
CPC ................... B60R 2300/303; B60R 2300/306; B60R 2300/308
See application file for complete search history.

(56) References Cited

U.S. PATENT DOCUMENTS

| | | | |
|---|---|---|---|
| 4,777,527 A | 10/1988 | Camps et al. |
| 5,729,016 A | 3/1998 | Klapper et al. |
| 5,771,484 A | 6/1998 | Tognazzini |
| 5,949,331 A | 9/1999 | Schofield et al. |
| 5,987,152 A | 11/1999 | Weisser |
| 6,028,624 A | 2/2000 | Watkins |
| 6,119,055 A | 9/2000 | Richman |
| 6,226,389 B1 | 5/2001 | Lemelson et al. |
| 6,317,058 B1 | 11/2001 | Lemelson et al. |
| 6,362,773 B1 | 3/2002 | Pochmuller |
| 6,498,620 B2 | 12/2002 | Schofield et al. |

(Continued)

OTHER PUBLICATIONS

"U.S. Appl. No. 12/469,271 Office Action", Sep. 28, 2011, 19 pages.

(Continued)

*Primary Examiner* — Thu Nguyen
*Assistant Examiner* — Angela Widhalm
(74) *Attorney, Agent, or Firm* — DeLizio Gilliam, PLLC

(57) ABSTRACT

Embodiments described herein comprise a system and method for improving visibility of a roadway using an improved visibility system. The method comprising receiving data from a plurality of fog detectors located proximate a roadway and determining, based on the data from the plurality of fog detectors, that fog is present about the roadway. The method further comprising obtaining, after the determining that fog is present about the roadway, a plurality of images of the roadway by activating a plurality of cameras located proximate the roadway. The method further comprising creating a composite image by combining two or more of the plurality of images, wherein the composite image depicts the roadway unobstructed by fog and transmitting the composite image to a display device located in a vehicle traveling along the roadway.

15 Claims, 9 Drawing Sheets

(56) References Cited

U.S. PATENT DOCUMENTS

| | | |
|---|---|---|
| 6,553,130 B1 | 4/2003 | Lemelson et al. |
| 6,611,202 B2 | 8/2003 | Schofield et al. |
| 6,633,238 B2 | 10/2003 | Lemelson et al. |
| 6,642,839 B1 | 11/2003 | Gunderson et al. |
| 6,681,058 B1 | 1/2004 | Hanna et al. |
| 6,693,518 B2 * | 2/2004 | Kumata et al. ............... 340/435 |
| 6,727,807 B2 * | 4/2004 | Trajkovic et al. ............. 340/436 |
| 6,738,088 B1 | 5/2004 | Uskolovsky et al. |
| 6,812,855 B1 | 11/2004 | Sudou et al. |
| 6,888,447 B2 | 5/2005 | Hori et al. |
| 6,895,126 B2 | 5/2005 | Di Bernardo et al. |
| 6,947,064 B1 * | 9/2005 | Hahn et al. ................... 701/301 |
| 7,049,945 B2 | 5/2006 | Breed et al. |
| 7,176,959 B2 | 2/2007 | Sato et al. |
| 7,176,989 B2 | 2/2007 | Takahara et al. |
| 7,218,758 B2 | 5/2007 | Ishii et al. |
| 7,350,945 B2 | 4/2008 | Albou et al. |
| 7,489,303 B1 | 2/2009 | Pryor |
| 7,680,592 B2 | 3/2010 | Ikeda |
| 7,693,629 B2 | 4/2010 | Kawasaki |
| 7,817,183 B2 | 10/2010 | Pallaro et al. |
| 7,835,854 B2 | 11/2010 | Yamamoto et al. |
| 7,873,235 B2 | 1/2011 | Steiger |
| 7,983,447 B2 | 7/2011 | Higuchi et al. |
| 8,094,970 B2 | 1/2012 | Nakanishi et al. |
| 8,098,890 B2 | 1/2012 | Haseyama |
| 8,451,107 B2 * | 5/2013 | Lu et al. ........................ 340/435 |
| 8,502,856 B2 * | 8/2013 | Cranfill et al. ............. 348/14.02 |
| 2002/0008637 A1 | 1/2002 | Lemelson et al. |
| 2002/0110262 A1 | 8/2002 | Iida et al. |
| 2002/0181739 A1 | 12/2002 | Hallowell et al. |
| 2003/0023373 A1 * | 1/2003 | Hessing et al. ............... 701/211 |
| 2003/0123752 A1 | 7/2003 | Ishii et al. |
| 2004/0107042 A1 | 6/2004 | Seick |
| 2005/0031169 A1 | 2/2005 | Shulman et al. |
| 2005/0072907 A1 | 4/2005 | Pallaro et al. |
| 2005/0073431 A1 | 4/2005 | Moisel et al. |
| 2005/0073583 A1 | 4/2005 | Moisel et al. |
| 2005/0075760 A1 | 4/2005 | Moisel et al. |
| 2005/0180149 A1 | 8/2005 | Albou et al. |
| 2005/0220361 A1 | 10/2005 | Yamasaki |
| 2005/0222753 A1 | 10/2005 | Ishikawa |
| 2006/0132602 A1 | 6/2006 | Muto et al. |
| 2006/0187305 A1 * | 8/2006 | Trivedi et al. ................. 348/169 |
| 2007/0152804 A1 | 7/2007 | Breed et al. |
| 2007/0219709 A1 | 9/2007 | Ikeda |
| 2007/0230800 A1 | 10/2007 | Miyahara |
| 2007/0236343 A1 | 10/2007 | Becksted et al. |
| 2007/0279250 A1 | 12/2007 | Kume et al. |
| 2008/0015772 A1 | 1/2008 | Sanma et al. |
| 2008/0170754 A1 | 7/2008 | Kawasaki |
| 2008/0181535 A1 | 7/2008 | Steiger |
| 2008/0317287 A1 | 12/2008 | Haseyama |
| 2009/0022423 A1 | 1/2009 | Ehlgen et al. |
| 2009/0085923 A1 | 4/2009 | Nakanishi et al. |
| 2009/0092334 A1 | 4/2009 | Shulman et al. |
| 2009/0256910 A1 | 10/2009 | Ganeshan |
| 2010/0157061 A1 | 6/2010 | Katsman et al. |
| 2010/0295937 A1 | 11/2010 | Longobardi |

OTHER PUBLICATIONS

"U.S. Appl. No. 12/469,271 Final Office Action", May 23, 2012, 17 pages.

Hallowell, R.G. et al., "Automated Extraction of Weather Variables from Camera Imagery", Proeedings of the 2005 Mid-Continent Transportation Research Symposium Aug. 2005, 13 pages.

Hautiere, N et al., "Meteorological Conditions Processing for Vision-Based Traffic Monitoring.", International Workshop on Visual Surveillance European Conference on Computer Vision Sep. 29, 2008, 8 pages.

Ichihara, E et al., "NaviView: Visual Assistance Using Roadside Cameras-Evaluation of Virtual Views", Intelligent Transportation Systems, 2000 Proceedings. 2000 IEEE Oct. 2000, pp. 322-327.

Lchihara, E et al., "NaviView: Bird's-Eye View for Highway Drivers Using Roadside Cameras", Multimedia Computing and Systems, 1999 IEEE International Conference on, vol. 2 Jul. 1999, pp. 559-565.

Taya, F et al., "NaviView: Virtual Mirrors for Visual Assistance at Blind Intersection", International Journal of ITS Research, vol. 3, No. 1 Nov. 2005, pp. 29-38.

* cited by examiner

TRAFFIC SYSTEM FOR ENHANCING DRIVER VISIBILITY

RELATED APPLICATION

This application is a continuation of U.S. patent application Ser. No. 12/469,271, filed May 20, 2009.

BACKGROUND

Embodiments of the inventive subject matter generally relate to the field of improved navigation, and, more particularly, to a system for improving visibility in the presence of fog.

Modern cars are equipped with lights to assist the driver's vision while driving on a roadway. Typically a car will include headlights, tail lights and reverse lights that enable the driver to see further in the dark than they would be able to see and be seen without the lights. When a driver is driving in fog, it is often difficult to see more than a few feet in front of the car even with the assistance of the headlights. Some cars are also equipped with fog lights. Fog lights are adapted to increase the driver's vision slightly beyond what the typical headlight enables the driver to see past in the fog. Even with the fog lights, however, the driver's vision in fog is typically limited to a few feet in front of the car.

SUMMARY

Embodiments described herein comprise methods, systems, and computer program products for improving visibility of a roadway using an improved visibility system. A method comprising receiving data from a plurality of fog detectors located proximate a roadway and determining, based on the data from the plurality of fog detectors, that fog is present about the roadway. The method further comprising obtaining, after the determining that fog is present about the roadway, a plurality of images of the roadway by activating a plurality of cameras located proximate the roadway. The method further comprising creating a composite image by combining two more of the plurality of images, wherein the composite image depicts the roadway unobstructed by fog and transmitting the composite image to a display device located in a vehicle traveling along the roadway.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
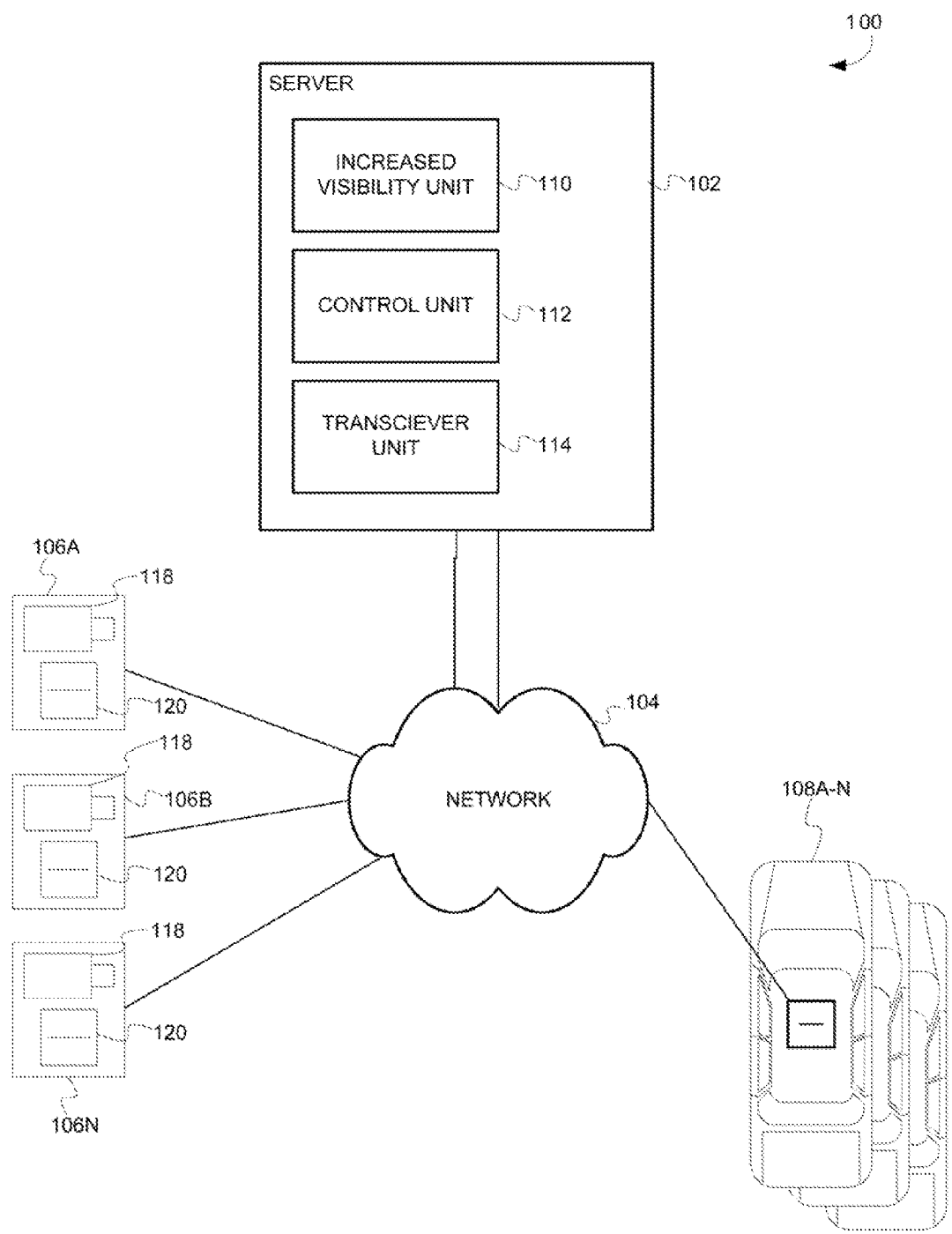
FIG. 1 depicts a block diagram illustrating an improved visibility system configured to activate a plurality of cameras, combine the images from the plurality of cameras and display the combined image to a driver in an embodiment of the invention.

The description that follows includes exemplary systems, methods, techniques, instruction sequences and computer program products that embody techniques of the present inventive subject matter. However, it is understood that the described embodiments may be practiced without these specific details. For instance, although examples refer to improving a driver's visibility in fog, it should be understood that the methods described herein may be used for improving an operator's understanding of the route ahead in any condition, for example, at night, in a dust storm, rain storm, blizzard, and the like. In other instances, well-known instruction instances, protocols, structures and techniques have not been shown in detail in order not to obfuscate the description.

Embodiments described herein comprise a system and method for improving visibility of a roadway using an improved visibility system. The improved visibility system allows the presence of fog to be detected along a roadway. The improved visibility system may then activate a plurality of cameras along the roadway where the fog is present. The cameras are used to take a plurality of images of the roadway where the fog is present. The plurality of images may be combined in order to provide a view of the roadway. The view of the roadway may then be sent to one or more vehicles traveling along the roadway. The view may be displayed within each of the vehicles in order to increase the driver's understanding of the roadway ahead. The improved visibility system may update the image the driver views as the vehicle travels along different portions of the roadway.

In one embodiment, the improved visibility system detects the presence of fog along the roadway. Due to the presence of the fog, a plurality of cameras are activated. The plurality of cameras obtains a plurality of images of the roadway. A view of the roadway is constructed by combining one or more of the images. If a vehicle is travelling along the roadway, the view is sent to a display within the vehicle. A travel speed of the vehicle may then be determined. The view of the roadway may be updated and sent to the vehicle based on the travel speed of the vehicle.

Embodiments may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on any one component or it may execute on a plurality of components. In the latter scenario, remote components may be connected through any type of network, including a local area network (LAN), a personal area network (PAN), or a wide area network (WAN), or the connection may be made to an external computer (for example, through the Internet using an Internet Service Provider). It should be appreciated that the remote components or any element of the network may be connected to another component of the network via hard line, wireless or radio frequency.

FIG. 1 depicts a block diagram of an increased visibility system 100 configured to activate a plurality of cameras, combine the images from the plurality of cameras and display the combined image to a driver in an embodiment of the invention. As shown, the increased visibility system 100 may include a server 102, a communication network 104, a plurality of camera units 106A-N, and one or more vehicles 108A-N (clients). The server 102 may include an increased visibility unit 110, a control unit 112, and a transceiver unit 114. The transceiver unit 114 allows the server to send and receive data and/or communication. The communication network 104 allows for communication between the server 102, the plurality of camera units 106A-N and the one or more vehicles 108A-N. The control unit 112 manages the data sent to and from the plurality of camera units 106A-N and/or the one or more vehicles 108A-N. The camera units 106A-N may include any combination of a camera 118 and/or a fog detector 120. In some embodiments, the fog detector 120 can include a laser or other optical device.

The increased visibility unit 110 may be configured to determine, based on input from the fog detectors 120, the presence of fog. When fog is present, the increased visibility unit 110 may activate any number of the cameras 118 located in the camera units 106A-N. The increased visibility unit 110 may then direct the one or more of the cameras 118 to obtain images of the roadway where the fog is present. The increased visibility unit 110 may then combine the images from the one or more cameras 118 into a view of the roadway. The increased visibility unit 110 may further determine the presence of one or more vehicles 108A-N near the locations on the roadway where the fog is present. The increased visibility unit 110 may then send data representing the view of the roadway to devices within the one or more vehicles 108A-N. The increased visibility unit 110 may update the view as the vehicle 108 moves along the roadway. Although, the increased visibility unit 110 is described as being included in the server 102, any portion of it may be included in any other component, such as the camera units 106A-N, any of the vehicles 108A-N, etc.

The one or more camera units 106A-N may be prepositioned along a roadway and positioned to obtain images of the roadway. The camera units 106A-N may include any camera 118 or combination of cameras 118 capable of obtaining images of the roadway including, but not limited to a digital camera, a video camera, a analogue camera, a movie camera, a pinhole camera, a rangefinder camera, a single-lens reflex camera, a twin lens reflex camera, a view camera and the like. For example, the cameras 118 may be configured to take still pictures or images, or may be configured to take video images of the roadway.

The vehicles 108A-N are shown in the figures as automobiles; however, the vehicles 108A-N may be any combination of vehicles suitable for traveling along the roadway and/or route. For example, the vehicle may be a car, a truck, a semi-tractor trailer, a big rig, a bus, a motorcycle, a scooter, a golf cart, a club car, a go-cart, an ATV, an RV and the like. Further, it should be understood that the increased visibility system 100 may be used in any transit system. For example, the vehicle 108 may be a boat, a watercraft, a skier/snowboarder, and the like, while the route may be a canal, a waterway, an inter-coastal waterway, a bayou, a river, a swamp, a ski trail, and the like.

Figure 2:
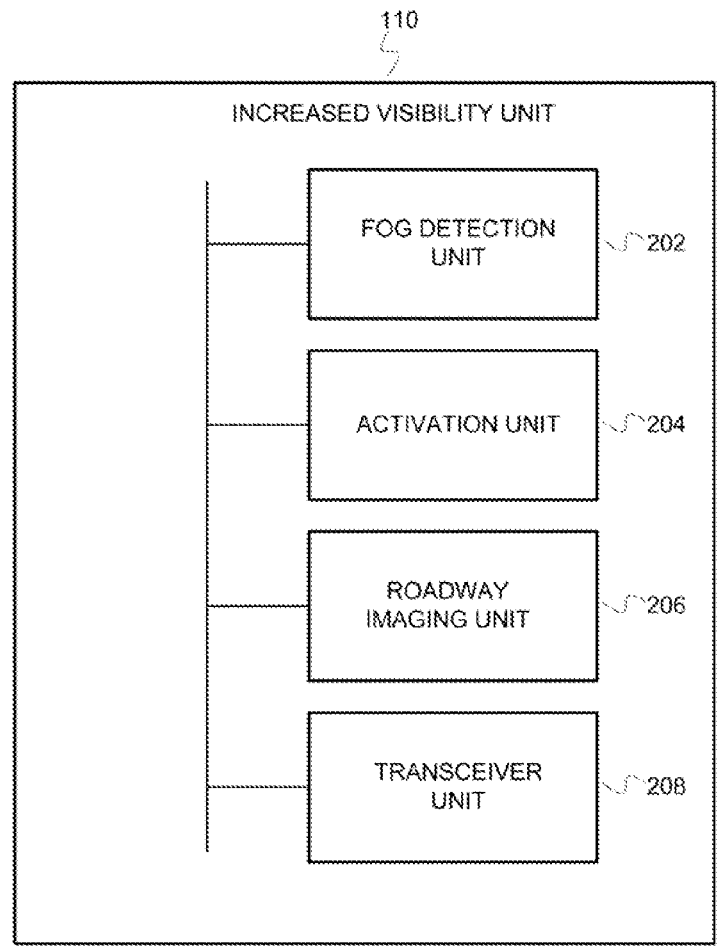
FIG. 2 depicts an increased visibility unit in an embodiment of the invention.

FIG. 2 depicts a block diagram of the increased visibility unit 110 in an embodiment of the invention. The increased visibility unit 110 may include a storage device 200, a fog detection unit 202, an activation unit 204, a roadway imaging unit 206, and a transceiver unit 208. The storage device 200 may store any suitable data, and/or information, relating to the increased visibility system 100 including, but not limited to the roadway conditions, the fog density, historical data about the roadway conditions, camera information, images of the roadway, combined images of the roadway and the like.

The fog detection unit 202 may be configured to detect the presence of fog, and/or an adverse roadway condition, on and/or near a roadway in an embodiment of the invention. In some embodiments, the fog detection unit 202 is not part of the increased visibility unit 110. The fog detection unit 202 may further detect the density of the fog. The fog detection unit 202 may use any number of systems and/or methods for obtaining data regarding the fog conditions at a location as will be discussed in more detail below.

The activation unit 204 may be configured to activate any number of the one or more cameras 118 when fog, and/or a driver, is present on the roadway. The activation unit 204 may receive fog data from the fog detection unit 202, and/or one or more fog detectors 120 located near the roadway. Based on the fog data, the activation unit 204 may activate any number of the cameras 118 in order to obtain images of the roadway. When the fog lifts or leaves the area near the roadway, the activation unit 204 may shut down the one or more cameras 118 in order to save power.

The roadway imaging unit 206 may be configured to construct one or more views of the roadway. The one or more views of the roadway allow a driver to see what is beyond their line of vision in the fog, as will be described in more detail below. The roadway imaging unit 206 constructs the one or more views of the roadway from the images of the roadway obtained from the one or more cameras 118. The roadway imaging unit 206 may combine multiple images obtained from the cameras 118 in order to construct the view of the roadway. In one embodiment, the roadway imaging unit 206 may construct multiple views of the roadway in order to allow a driver to improve visibility at multiple locations along the roadway.

The transceiver unit 208 is configured to send and receive data to and from the increased visibility unit 110. For example, the transceiver unit 208 may receive images from the one or more cameras 118. The transceiver unit 208 may receive data from the fog detectors 120. The transceiver unit 208 may send instructions to the one or more camera units 106A-N, and views of the roadway to one or more vehicles 108A-N. The transceiver unit 208 may be any unit capable of sending and receiving data.

Figure 3:
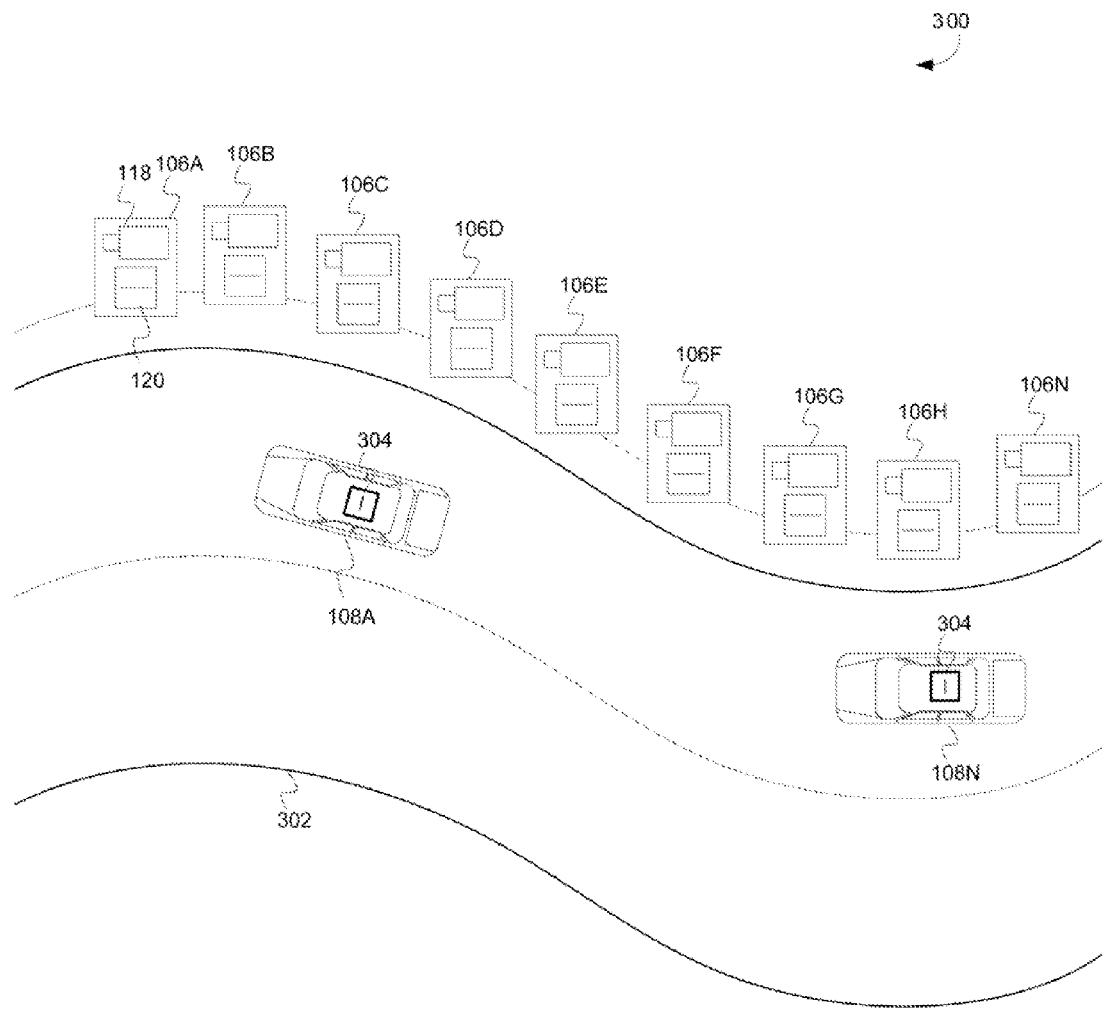
FIG. 3 depicts a schematic diagram of a transit system in an embodiment of the invention.

FIG. 3 depicts a transit system 300, in an embodiment of the invention. The transit system 300 includes a roadway 302, one or more vehicles 108A-N traveling along the roadway 302 and one or more camera units 106A-N located proximate the roadway 302. One or more of the vehicles 108A-N may include a display device 304 located within the vehicle 108A-N. The vehicles 108A-N may be any suitable vehicle, including any of the vehicles described herein.

The roadway 302 is shown as a two lane highway. However, the roadway 302 may be any suitable route on a transit system including, but not limited to, a freeway, a street, a boulevard, a route, a lane, a railway, a canal, a path, a trail, a cart-path, a racetrack, etc.

The display device 304 may be any device capable of allowing the driver of the vehicles 108A-N to see the view of the roadway 302 sent by the increased visibility unit 110. The display device 304 may be a screen located on or near a dashboard one or more of the vehicles 108A-N. The screen may be any screen capable of displaying the view to the driver, including but not limited to, a liquid crystal display LCD, a plasma screen, a projected image, a cathode ray screen, a flat panel display, a vacuum fluorescent display, a light emitting diode display, a plasma display panel, a thin film transistor, an organic light emitting diode, a surface-conduction electron emitter display, a laser TV, and the like. The display device 304 may be an integral part of the vehicle 108, in an embodiment of the invention. Further, it should be appreciated that the display device 304 may be a separate component that the driver may attach and/or bring to the vehicle 108. Further, the display device 304 may be incorporated into any suitable handheld device including, but not limited to, a cell phone, an MP3 Player, a personal digital assistant, a GPS, and the like. Further still, the display device 304 may be located outside the vehicles on a screen or screens along the roadway. For example, there may be several screens located along the roadway that drivers could see as they travel along the roadway.

The camera units 106A-N, as shown, are equally spaced along the roadway 302; however, it should be appreciated that the spacing of the camera units 106A-N may depend on any number of variables. For example, the camera units' spacing may vary based on obstructions along the roadway 302. Further, the spacing may be closer along portions of the roadway 302 where there is a high frequency of fog and spaced further apart where there is a lower frequency of fog. The distance between the camera units 106A-N may be any suitable distance that allows the cameras 118 and/or the fog detectors 120 to obtain images and/or detect fog. The camera units 106A-N are shown to include both the camera 118 and the fog detector 120, however, it should be appreciated that the camera 118 and the fog detectors 120 may be separate.

Figure 4A:
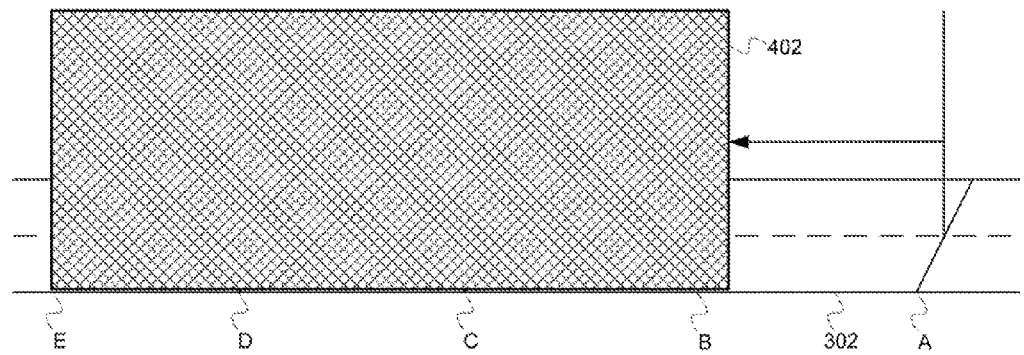
FIG. 4A depicts a schematic diagram of a view of a roadway in an embodiment of the invention.
Figure 4B:
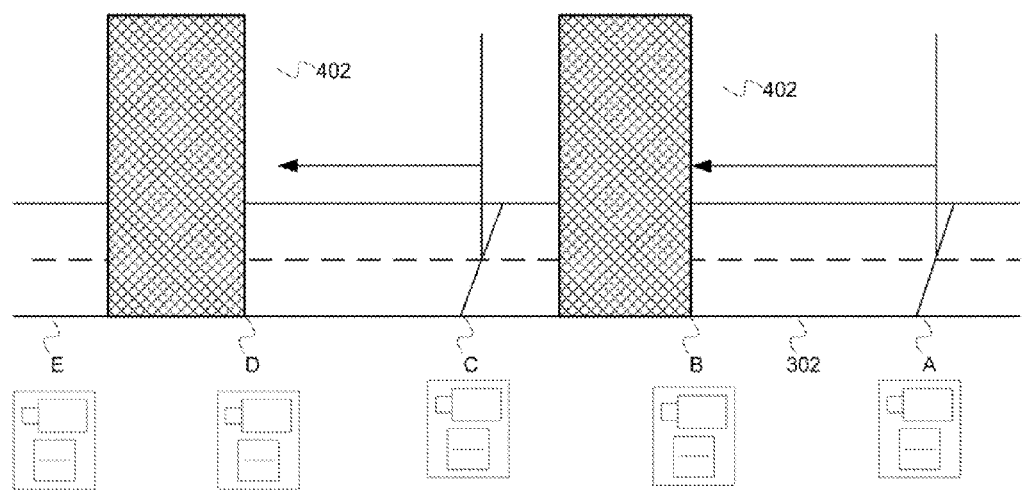
FIG. 4B depicts a schematic diagram of a view of a roadway in an embodiment of the invention.

The increased visibility system 100 can increase a driver's ability to see a roadway in fog. As shown in FIG. 4A, when fog or another obstruction (e.g., snow) is present, a driver may only see ahead to a wall of visibility 402. The wall of visibility 402 represents fog or other obstruction that prevents drivers from seeing beyond the obstruction. In FIG. 4B, a driver at location A may only be able to see to the wall of visibility at location B. The locations beyond location B, such as locations C-E, are beyond the drivers view. When the driver moves to location C, the driver may only be able to see up to the wall of visibility, which may now be located at location D. In snow, the distance beyond the wall of visibility simply appears to be a white mass ahead of the driver. It should be appreciated that the increased visibility system 100 may be suitable for increasing a driver's ability to see in the presence of any type of obstruction including, but not limited to, rain, snow, freezing rain, sleet, hail, dust storms, darkness, etc.

FIG. 4B shows schematic of a roadway with camera positions at locations A, B, C, D, and E. In the view shown, camera units at location A and location C are activated and obtaining images of the roadway 302. The camera at location A obtains an image of the roadway 302 up to location B. When fog is present, the roadway beyond location B may not be visible from location A. The camera at location C obtains an image of the roadway 302 up to the wall of visibility at location D. With only cameras at locations A and C activated, the view of the entire roadway may not be obtained due to the location of the wall of visibility 402. Thus, to view the entire roadway 302, all of the cameras in this section of roadway 302 may be activated.

Figure 5:
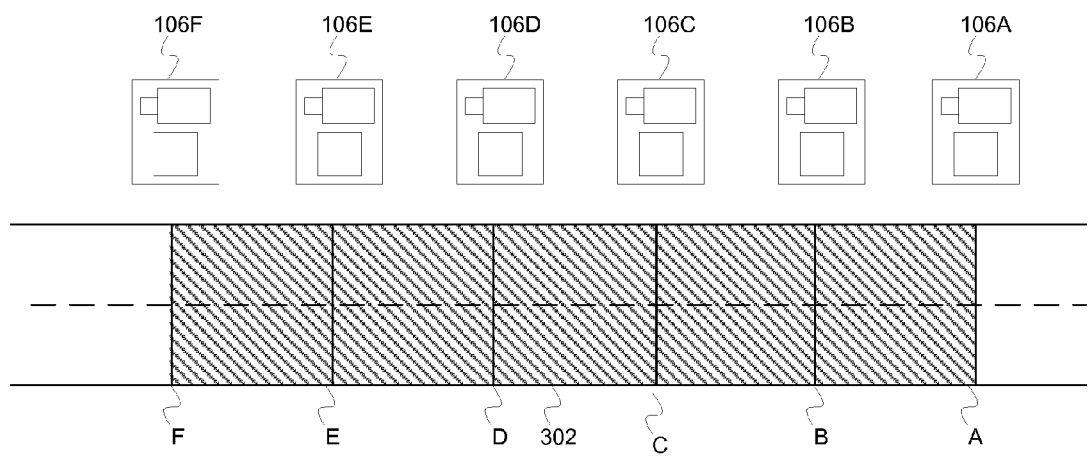
FIG. 5 depicts a schematic of a roadway in an embodiment of the invention.

FIG. 5 shows a schematic of a roadway on which all cameras have been activated to obtain images of the roadway. With each of the cameras 106A-F obtaining images of the roadway 302, the system can obtain images of the entire roadway 302 (i.e., the roadway from location A to location F), as represented by the shaded portion of the roadway 302. The increased visibility system can process the obtained images to form a composite image. The composite image can include elements from a plurality of images, and therefore can present a roadway view spanning from location A to location F.

Figure 6A:
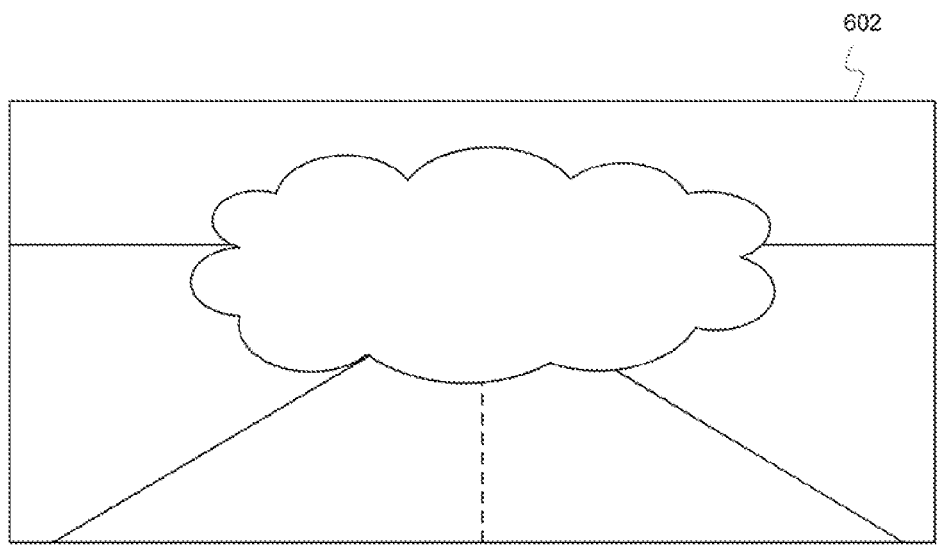
FIGS. 6A-6D show how a composite image is formed, according to some embodiments.
Figure 6B:
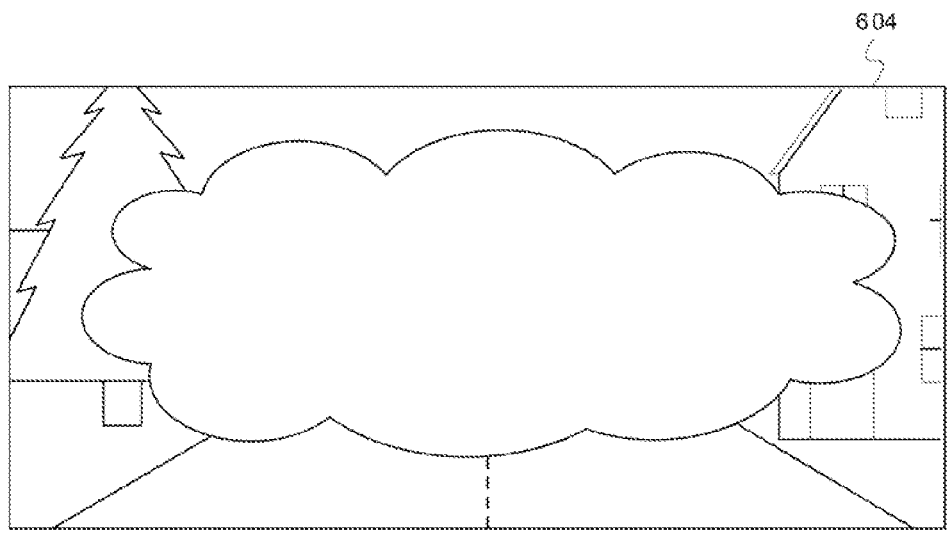
Figure 6C:
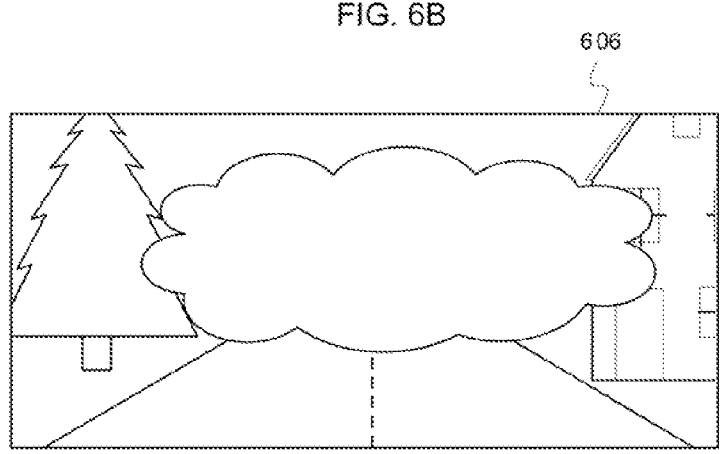
Figure 6D:
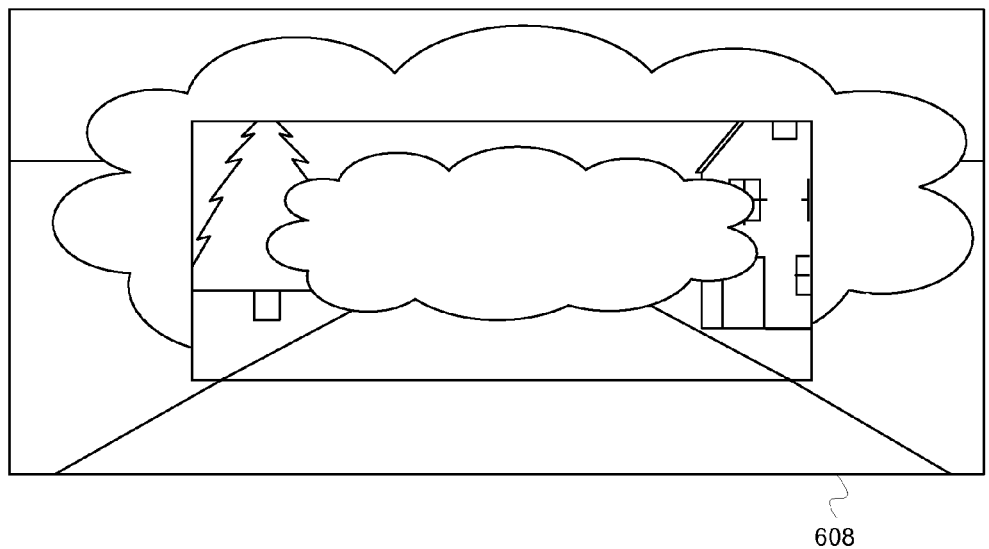

To create a composite image showing a portion of the roadway, such as the roadway portion spanning from location A to location C, the system can shrink and combine images. FIGS. 6A-D help illustrate this concept. FIG. 6A shows a first image captured by a first camera, such as the camera posited at location A (FIG. 5). FIG. 6B shows a second image captured by a second camera, such as the camera positioned at location B (FIG. 5A). The increased visibility unit 110 can create a composite image by shrinking the second image and combining the shrunken second image with the first image. FIG. 6C shows how the increased visibility unit 110 can shrink the second image, while FIG. 6D shows a composite image 602 made by combining the first image (i.e., the image in FIG. 6A) with the shrunken second image (i.e., the image FIG. 6C). In FIG. 6D, the shrunken second image overlays the first image so the roadway between locations A & C appears unobstructed by fog. The increased visibility system can create an unobstructed view of the entire roadway by repeating this process for all the images from the active cameras.

Figure 7:
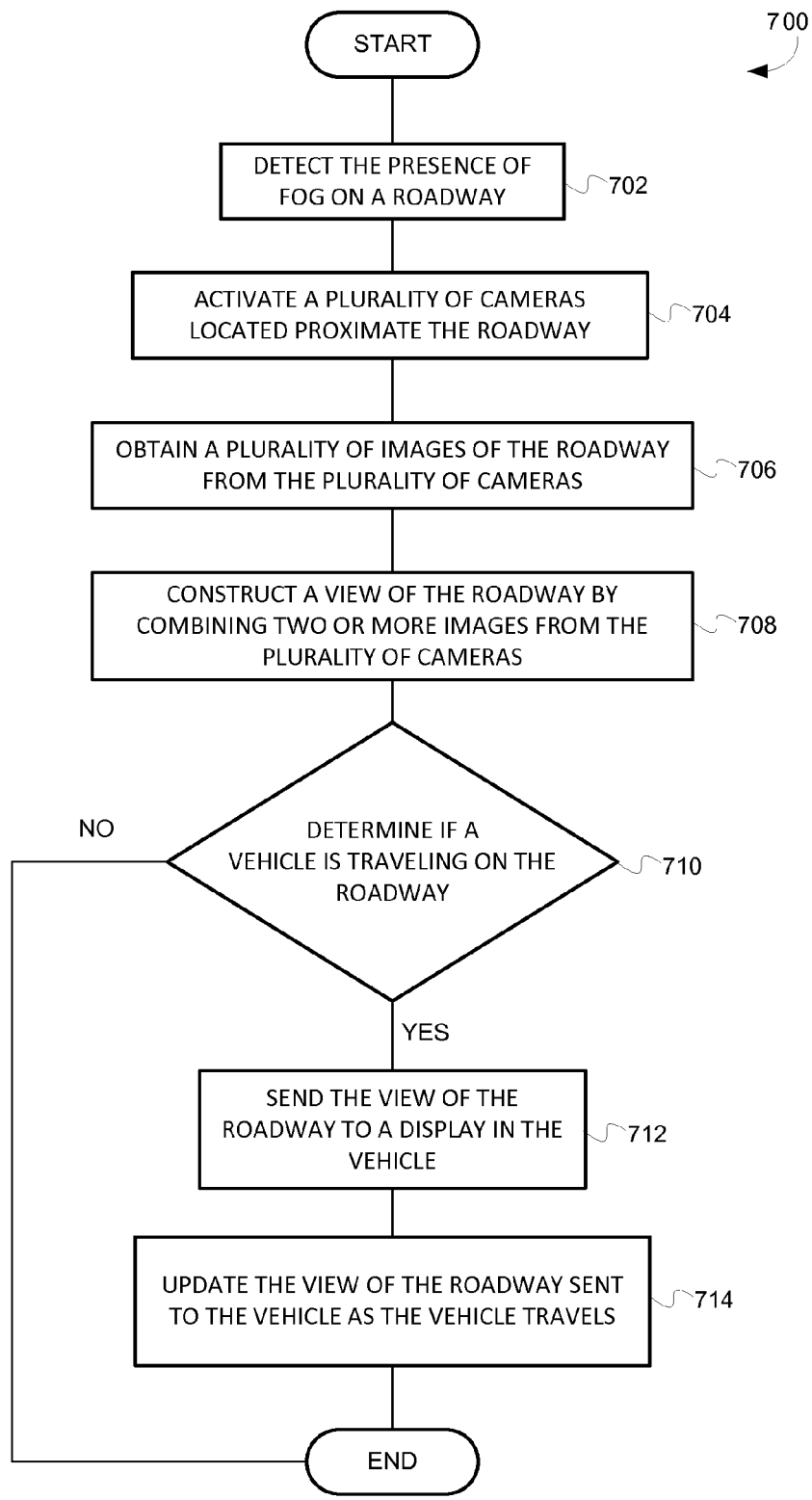
FIG. 7 depicts a flowchart illustrating operations of the improved vision system in an embodiment of the invention.

FIG. 7 depicts a flow diagram 700 illustrating the operations of the increased visibility system 100, according to some embodiments of the invention. The flow begins at block 702, where a presence of fog is detected on a roadway. In some embodiments, the fog detectors 120 detect the presences of the fog near the roadway 302. The fog detectors 120 may also detect the density of the fog near the roadway 302. The data collected from the fog detectors 120 is sent to the fog detection unit 202. The fog detection unit 202 may determine the presence of fog, based on the data collected from the fog detectors 120. Further, the fog detection unit 202 may determine the density of the fog.

In one example, the fog detectors 120 include a light source emitted from a first location to a light collector located at a second location. In this example, the light source may be located at the first location, which may be at the camera unit 106A, and light collector may be located at the second location, which may be another camera unit 106B. The light source may send light signals or light waves to the light collector. If a decrease in the intensity of the light occurs, there is an obstruction between the light source and the light collector. The fog detector 120 may send data regarding the decrease in intensity to the fog detection unit 202. The fog detection unit 202 may then determine the density of the obstruction (e.g., fog) between the camera units 106A and 106B. This type of fog detection system may be included in all of the camera units 106A-N thereby giving the increased visibility system 100 a measure of the fog presence and density at each location along the roadway 302. Although the fog detector 120 is described as a light source and a light collector, it should be appreciated that the fog detector may be any suitable fog detection apparatus or system.

In yet another example, the fog detector 120 is located on the vehicle 108. Thus, the fog detector 120 located on the vehicle 108 may detect the presence of fog and wirelessly send the fog data to the fog detection unit 202. The fog detector 120 in this example may be any suitable fog detector described herein.

In yet another example, the increased visibility unit 110 may store the fog presence and density information for particular portions of the roadway 302. For example, the fog detection unit 202 may collect and store data for a fog prone portion of the roadway 302 to create a historical fog data. The increased visibility unit 110 may then use the historical fog data to predict when fog, or other roadway obstructions are most likely to be present. For example, the increased visibility unit 110 may determine that a first portion of the roadway is typically foggy in between 4 a.m. and 9 a.m. based on the historical fog data. The increased visibility unit 110 may use this information to increase the frequency of the fog tests during peak fog hours. The increased visibility unit 110 may further, use this information to decrease the frequency of the fog test during non-peak fog hours.

In yet another example, the increased visibility unit 110 does not detect the presence of fog. In this example, the cameras 118 may continuously obtain images of the roadway 302 regardless of the presence of fog or any other obstruction. The views of the roadway may continuously be sent to the displays 304. Further, the driver of the vehicle 108 may initiate when the view is sent to the display 304 by requesting the display 304 receive the view of the roadway 302. The driver may request that the display 304 receive the view of the roadway by any suitable method including, but not limited to, turning the display on, pressing a button, flipping a switch, voice activated command and the like.

The flow continues at block 704, where one or more cameras 118 are activated proximate the roadway 302. The one or more cameras 118 may be activated in response to detected fog. The activation unit 204 may activate any number of the cameras 118 located proximate the roadway 302. The cameras 118 may be any combination of cameras described herein.

In one example, all of the cameras 118 along a portion of the roadway will be activated in response to the fog data. Thus, when fog is detected by the fog detectors 120 proximate the roadway 302, the activation unit 204 activates all of the cameras 118 proximate the roadway 302. All of the cameras 118 may be necessary in very dense fog, where it is necessary to take an image of the roadway 302 at very close intervals.

In yet another example, the activation unit 204 may only activate a portion of the cameras 118 along the roadway. For example, the fog detector 120 may detect the presence of fog proximate the roadway 302; however, the fog may not be very dense. In this example, only a portion of the cameras 118, for example every other camera, may be necessary to obtain the view of the roadway 302.

In yet another example, the activation unit 204 may activate the cameras 118 based on the historical fog data for a particular portion of the roadway 302. Thus, the activation unit 204 may automatically activate the cameras 118 at times when it is most probable that fog may be obstructing the view of drivers along the roadway 302. For example, the activation unit 204 may automatically activate the cameras 118 between the hours of 4 a.m and 9 a.m. in the winter in a particular location.

In yet another example, the activation unit 204 may activate the cameras 118 based on the presence of a vehicle 108 proximate the roadway 302. Thus, the cameras 118 may activate when a vehicle 108 is approaching the roadway 302.

In yet another example, the activation unit 204 may be optional and the cameras 118 may be on all the time. Thus, the cameras 118 may continuously film the roadway 302.

Any of the examples for activating the cameras 118 along the roadway 302 may be used in combination with other methods of activating the cameras 118 or as alternative methods of activating the cameras 118.

The cameras 118 may be deactivated when any of the activation basis are not present. For example, the cameras 118 deactivation basis may include any suitable deactivation basis including, but not limited to, the fog lifting, the vehicle is not present, when the historical fog data shows that the fog should lift, and any combination thereof, and the like.

The flow continues at block 706, where a plurality of images of the roadway is obtained from the plurality of cameras 118. The activated cameras 118 may take still picture images and/or video images of the roadway 302. Each of the cameras 118 located on the camera units 106A-N may be positioned to obtain an image of a particular portion of the roadway 302. Thus, the camera 118 located at camera unit 106A may obtain an image of the roadway 302 located in a portion of the roadway in front of the camera unit 106A and possibly to a location beyond the camera unit 106B. In yet another example, the camera 118 may only obtain an image of the roadway 302 up to the point proximate the location where the camera 118 located on the camera unit 106B is located. Each of the cameras 118 of the camera units 106A-N may take pictures of any portion of the roadway so long as images of a substantial portion of the roadway may be obtained by the plurality of cameras 118. The images of the roadway 302 may be obtained continuously by the cameras 118.

Each of the cameras 118 may be configured to obtain an image of the roadway 302 that is within the distance of the wall of visibility. Thus, if the wall of visibility is typically at a location 110 meters ahead of a driver, the cameras may be configured to obtain the image up to a location, or less than the distance, of the wall of visibility. The cameras 118 may be preset to obtain images within a typical distance of the wall of visibility, based on the historical fog data in one example. Thus, the cameras 118 would always obtain images within the wall of visibility.

In yet another example, the cameras 118 may adjust to obtain images at a shorter or longer distance depending on the location of the wall of visibility. In this example, the fog detection unit 202 may determine the probable location of the wall of visibility based on the fog data received from the fog detectors 120. The increased visibility unit 110 may then adjust the distance the cameras 118 to obtain the images based on the wall of visibility.

In yet another example, the fog density may be low and therefore the wall of visibility may extend a distance beyond two camera units 106. In this example, the activation unit 204 may only need to activate select cameras 118 in order obtain the necessary images of the roadway 302 within the wall of visibility.

In yet another embodiment, the images of the roadway are obtained intermittently. Thus, the each of the cameras 118 may obtain an image of the roadway 302 at timed intervals. The time intervals may be based on the rate of speed of the drivers on the roadway 302.

The flow continues at block 708, where a view of the roadway 302 is constructed by combining two or more images from the plurality of cameras 118. The view may be constructed as a perspective view. The perspective view may be a view of the roadway 302 substantially from a driver's perspective. The perspective view of the roadway 302 may be constructed by combining the multiple images obtained by the cameras 118. The first image from the closest camera 118 to the vehicle 108 would be sized the largest. The second image from the second camera 118 from the vehicle 108 would be sized smaller than the first image from the first camera. These images may be combined with the smaller second image located in the center of, or within, the first image in order to present a combined perspective view of the roadway 302. Thus, the first image shows the portion of the roadway 302 closest to the driver and the second image shows the next portion of roadway 302, which may be obstructed by the wall of visibility. These images are combined so that the displayed view shows the first portion of the roadway 302 and a resized second portion of the roadway 302 as one continuous roadway from a perspective view of the roadway 302. Thus, the combined image appears as if the first portion is closest and the second portion is the beyond the first portion as it would appear if you were looking out a window and no fog, or obstruction was present. Although only two images are described as being combined, it should be appreciated that the perspective view may combine any number of images from the cameras 118 in order to create the view of the roadway 302. The perspective view of the roadway 302 may be constructed from the point of view of the driver, or any other location. Further, the perspective view may constructed starting at the camera 118 closest to the driver or at any other of the cameras 118 along the roadway 302.

In another example, the constructed view may be the view of the first image past the wall of visibility. For example, the driver may be able to see the roadway 302 up to the wall of visibility. The display 304 may show the image taken from the next portion of the roadway 302 past the wall of visibility. Thus, the driver would be able to look at the display 304 to see the next portion of the roadway past the wall of visibility. Further, there may be more than one single view of roadway 302 wherein each view shows each of the next portions of the roadway 302 to the driver.

The flow continues at block 710, where it is determined if a vehicle 108 is on the roadway 302. The increased visibility system 100 may determine the presence of a vehicle 108 by receiving a signal from an approaching vehicle 108. For example, a transceiver, not shown, associated with the display 304 may send out a data signal indicating the presence of the vehicle 108 and the capability of the vehicle 108 to receive the view. Although it is described as the display 304 sending the signal to the increased visibility system 100, it should be appreciated that any portion of the vehicle 108 may be configured to send the signal indicating the vehicles 108 approach.

The increased visibility unit 110 may be able to determine the location of the vehicle 108 from the signal sent. The location may be determined by GPS in one example. In another example, the location may be determined by triangulating the vehicles' 108 position between two or more of the camera units 106. Further, it should be appreciated that any suitable method for determining the location of the vehicles 108 may be used.

In another example, the increased visibility system 100 may not determine the presence, and/or location, of the vehicles 108. In this example, the increased visibility unit 110 may constantly send the constructed views of the roadway 302 out. The views may be received by the vehicles 108 as they pass the portion of the roadway 302 with the cameras 118. For example, several locations on the roadway 302, and/or the camera units 106A-N may send the constructed views to the vehicles 108 as they pass the location, and/or camera unit 106, thereby alleviating the need to determine the location of the vehicles 108.

If it is determined that no vehicles 108A-N are on the roadway 302, the flow ends. If it is determined that one or more vehicles 108A-N are on the roadway 302, the flow continues at block 412, where the constructed view is sent to the display 304 in the vehicle 108. The constructed view is then displayed on the display 304. With the constructed view on the display 304 the driver may be able to see the roadway 302 beyond the wall of visibility.

In another example, more than one view, image and/or constructed view may be sent to the vehicle 108. These views, images and constructed views may be displayed simultaneously on one display 304, or displayed on separate displays 304.

The flow continues at block 714, where the constructed view of the roadway 302 is updated as the vehicle 108 travels along the roadway 302. The constructed view of the roadway 302 may be updated as the vehicle 108 travels along the roadway 302 in order to constantly give the driver of the vehicle 108 a displayed view of the roadway 302 which is ahead of the vehicle 108. Thus, as the vehicle 108A passes a camera unit 106A the constructed view shown on the display 304 may include the roadway ahead of the camera unit 106A. When the vehicle 108 approaches and/or passes the next camera unit 106B the constructed view sent to the display 304 will be updated. The updated constructed view will show only the roadway 302 past the next camera unit 304B and beyond. This may be repeated past each of the camera units 106A-N. Thus, the constructed view shown on the display 304 may always show the roadway 302 in front of the vehicle 108. The view may be updated on a constant basis. Further, the view may be updated on an intermittent basis. The display 304 may be updated until the vehicle 108 exits the portion of the roadway 302 with fog. After the constructed view is updated to the vehicle 108 the flow ends at block 416.

Figure 8:
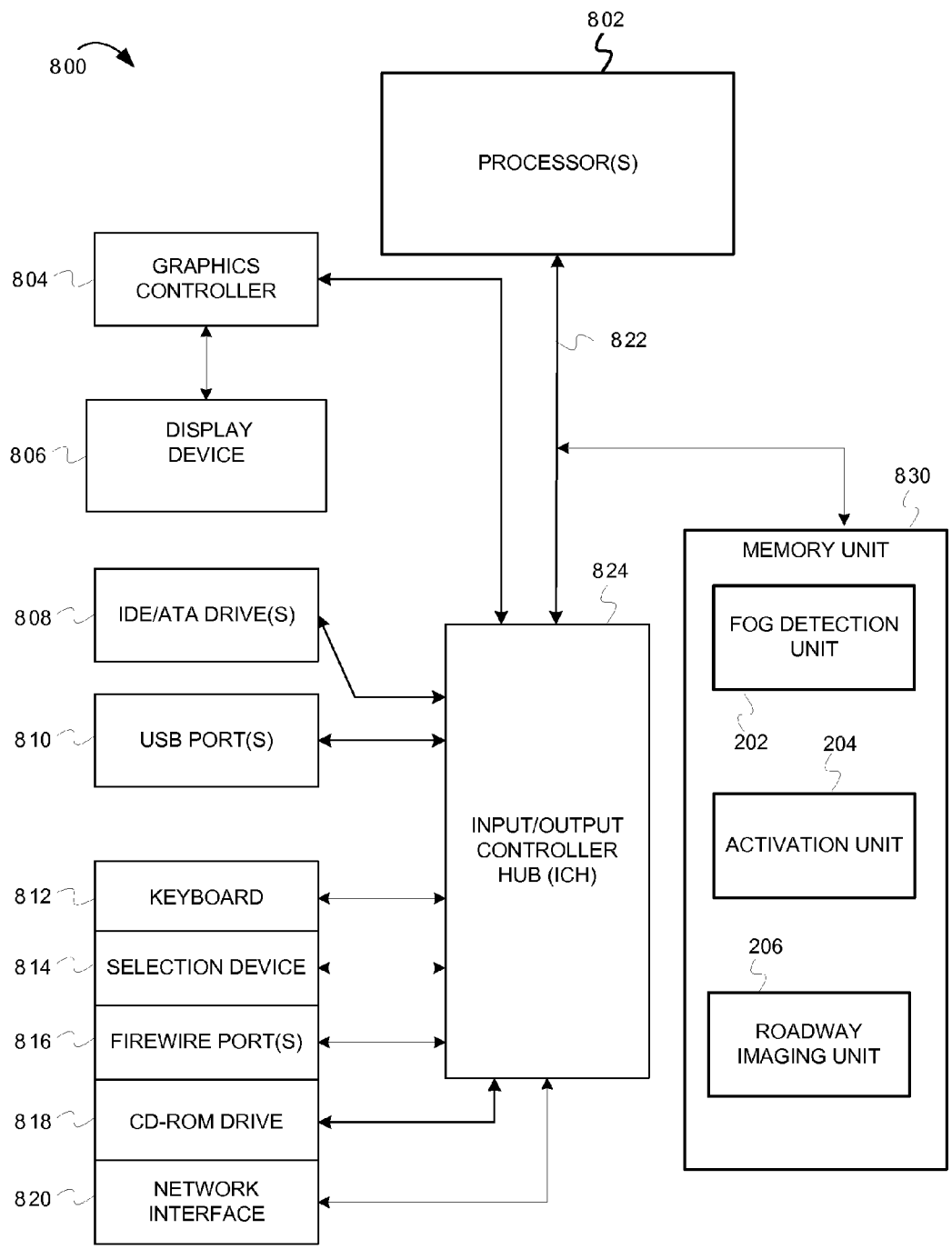
FIG. 8 depicts schematic diagram of a computer system in an embodiment of the invention.

FIG. 8 depicts an example computer system. A computer system includes a processor unit 802 (possibly including multiple processors, multiple cores, multiple nodes, and/or implementing multi-threading, etc.). The computer system includes memory 830. The memory 830 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.). The computer system also includes a bus 824 (e.g., PCI, ISA, PCI-Express, HyperTransport®, InfiniBand®, NuBus, etc.), a network interface 820 (e.g., an ATM interface, an Ethernet interface, a Frame Relay interface, SONET interface, wireless interface, etc.), and a storage device(s) 830 (e.g., optical storage, magnetic storage, etc.). The system memory 830 embodies functionality to implement embodiments described above. The system memory 830 may include one or more functionalities that facilitate detecting the presence of fog, obtaining a plurality of images of the roadway, constructing a view of the roadway by combining the plurality of images, and sending the constructed view to a display in the vehicle 108. To this end the memory 830 may include the fog detection unit 202, the activation unit 204, and the roadway imaging unit 206. Any one of these functionalities may be partially (or entirely) implemented in hardware and/or on the processing unit 802. For example, the functionality may be implemented with an application specific integrated circuit, in logic implemented in the processing unit 802, in a co-processor on a peripheral device or card, etc. Further, realizations may include fewer or additional components not illustrated in FIG. 8 (e.g., video cards, audio cards, additional network interfaces, peripheral devices, etc.). The processor unit 802, the storage device(s) 830, and the network interface 820 are coupled to the bus 824. Although illustrated as being coupled to the bus 824, the memory 830 may be coupled to the processor unit 802.

While the embodiments are described with reference to various implementations and exploitations, it will be understood that these embodiments are illustrative and that the scope of the inventive subject matter is not limited to them. In general, techniques for detecting the presence of fog, obtaining a plurality of images of the roadway, constructing a view of the roadway by combining the plurality of images, and sending the constructed view to a display 304 in the vehicle 108 as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    detecting a vehicle traveling along a roadway;
    receiving data from a plurality of fog detectors located proximate the roadway;
    determining, based on the data from the plurality of fog detectors, that fog is present about the roadway, wherein the fog limits visibility of the roadway;
    obtaining, after the determining that fog is present about the roadway, a plurality of images of the roadway by activating a plurality of cameras, including a first image from a first camera of the plurality of cameras and a second image from a second camera of the plurality of cameras, wherein the cameras are spaced along the roadway and configured to capture different portions of the roadway that are visible through the fog, and wherein each of the images includes one of the different portions of the roadway that is visible through the fog;
    shrinking the second image and positioning the second image over the first image in accordance with a perspective of a driver to create a composite image, wherein the composite image includes two or more of the different portions of the roadway that are visible through the fog, and wherein the composite image shows the roadway unobstructed by fog; and
    transmitting the composite image to a display device located in a vehicle traveling along the roadway.

2. The method of claim 1, further comprising:
    determining, based on the data, a density of the fog.

3. The method of claim 2, wherein the determining the density of the fog further comprises:
    sending a signal between at least some of the fog detectors.

4. The method of claim 1, further comprising detecting a location of the vehicle relative to the plurality of cameras.

5. The method of claim 1, further comprising:
    creating another composite image by combining another two or more of the plurality of images, wherein the other composite image depicts the roadway unobstructed by fog; and
    transmitting the other composite image to the display device located in the vehicle traveling along the roadway.

6. A system comprising:
    a fog detection unit configured to determine fog is present near a roadway, wherein the fog limits visibility of the roadway;
    a plurality of cameras located proximate the roadway, wherein the cameras are spaced along the roadway and configured to capture images, including a first image from a first camera of the plurality of cameras and a second image from a second camera of the plurality of cameras, wherein the images include different portions of the roadway that are visible through the fog;
    an activation unit configured to activate the plurality of cameras after fog is detected near the roadway;
    a roadway imaging unit configured to:
        receive the first image and the second image, and,
        shrink the second image and position the second image over the first image in accordance with a perspective of a driver to create a composite image, wherein the composite image includes two or more of the different portions of the roadway that are visible through the fog, and wherein the composite image shows the roadway unobstructed by fog; and
    a transceiver unit configured to send a signal that detects vehicles on the roadway, and to send the composite image to the vehicles traveling on the roadway.

7. The system of claim 6, wherein the fog detection unit is further configured to determine a density of the fog by emission and collection of a light.

8. The system of claim 6, further comprising:
    display devices located within the vehicles, wherein the display devices are configured to display the composite image.

9. The system of claim 8, wherein the display devices are handheld devices configured to be removed from the vehicles.

10. The system of claim 8, wherein the display devices are integrated into dashboards of the vehicles.

11. A computer program product comprising a computer readable memory device having program instructions embodied therewith, the program instructions executable by a processor to:
    detect a vehicle traveling along a roadway;
    receive data from a plurality of fog detectors located proximate the roadway;
    determine, based on the data from the plurality of fog detectors, that fog is present about the roadway, wherein the fog limits visibility of the roadway;

obtain, after the determination that fog is present about the roadway, a plurality of images of the roadway by activation of a plurality of cameras, including a first image form a first camera of the plurality of cameras and a second image from a second camera of the plurality of cameras, wherein the cameras are spaced along the roadway and configured to capture different portions of the roadway that are visible through the fog, and wherein each of the images includes one of the different portions of the roadway that is visible through the fog;

receive the first image and the second image, and, shrink the second image and position the second image over the first image in accordance with a perspective of a driver to create a composite image, wherein the composite image includes two or more of the different portions of the roadway that are visible through the fog, and wherein the composite image shows the roadway unobstructed by fog; and transmit the composite image to a display device located in a vehicle traveling along the roadway.

12. The computer program product of claim 11, wherein the instructions are further executable by the processor to:
determine, based on the data, a density of the fog.

13. The computer program product of claim 12, wherein the determination of the density of the fog includes transmission of a signal between some of the fog detectors.

14. The computer program product of claim 11, wherein the instructions are further executable by the processor to:
detect a location of the vehicle relative to the plurality of cameras.

15. The computer program product of claim 11, wherein the instructions are further executable by the processor to:
create another composite image by combining another two or more of the plurality of images, wherein the other composite image depicts the roadway unobstructed by fog; and
transmit the other composite image to the display device located in the vehicle traveling along the roadway.

* * * * *